United States Patent [19]

Klann

[11] Patent Number: 4,976,416
[45] Date of Patent: Dec. 11, 1990

[54] PRESSURE SPRING TENSIONER

[76] Inventor: Horst Klann, Terra Wohnpark 12, D-7730 Villingen-Schwenningen 24, Fed. Rep. of Germany

[21] Appl. No.: 359,519

[22] Filed: Jun. 1, 1989

[30] Foreign Application Priority Data

Jul. 7, 1988 [DE] Fed. Rep. of Germany ....... 3823041

[51] Int. Cl.$^5$ .......................... F16F 1/06; B25B 27/26; B23P 19/04
[52] U.S. Cl. ..................................... 267/177; 29/227; 254/10.5; 267/286
[58] Field of Search ............... 267/177, 166, 170, 287, 267/286; 29/227; 254/10.5

[56] References Cited

U.S. PATENT DOCUMENTS

| | | | |
|---|---|---|---|
| 4,219,918 | 9/1980 | Klann | 29/227 |
| 4,527,782 | 7/1985 | Klann | 267/177 |
| 4,541,614 | 9/1985 | Klann | 29/227 X |
| 4,679,780 | 7/1987 | Kloster | 29/227 X |
| 4,809,951 | 3/1989 | Klann | 29/227 X |
| 4,872,645 | 10/1989 | Dossier | 29/227 X |

FOREIGN PATENT DOCUMENTS 2813381 10/1979 Fed. Rep. of Germany ..... 254/10.5

*Primary Examiner*—Douglas C. Butler
*Attorney, Agent, or Firm*—McGlew and Tuttle

[57] ABSTRACT

A pressure spring tensioner comprises a cylindrical guiding tube having an axially elongated tube slot with a threaded spindle extended axially within the tube and rotatably mounted therein. The first sleeve is affixed to the tube adjacent an end thereof and it carries a first gripping clamp which is engageable over one end of the spring. A second sleeve assembly is slidable on the tube and it carries a second gripping clamp which engages with the opposite end of the spring. The second sleeve assembly includes a second sleeve slidable on the guiding tube and with a sliding snug fit and having a radial recess. A pad is arranged in the second sleeve in threaded engagement with the spindle and it has a radial finger extending through the tube slot which is of a length no longer than twice the thickness of the guiding tube and engages in the radial recess of the second sleeve.

9 Claims, 2 Drawing Sheets

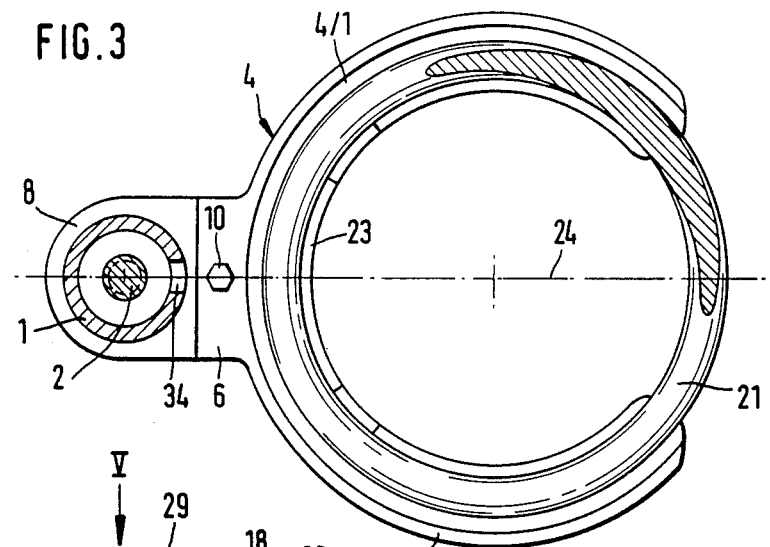
FIG. 3
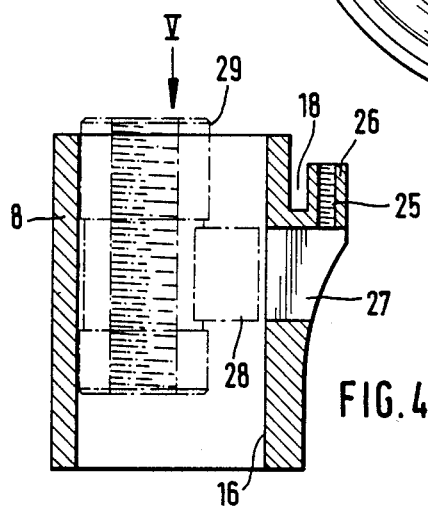
FIG. 4
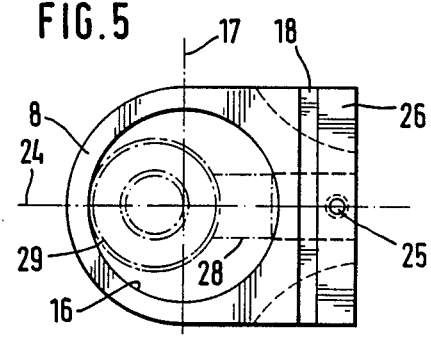
FIG. 5
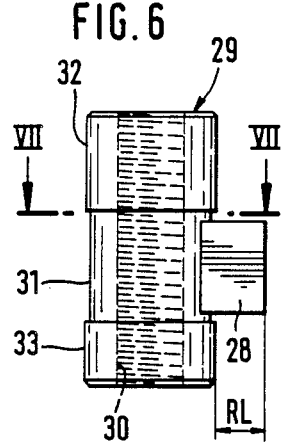
FIG. 6
FIG. 7

PRESSURE SPRING TENSIONER

BACKGROUND OF THE INVENTION

1. Field of the Invention

The invention relates in general, to springs, and in particular to a new and useful pressure spring tensioner, for the tightening of axle springs in motor vehicles. In particular, the invention includes a cylindrical guiding tube with a threaded spindle mounted rotatably therein and two gripping clamps, a first gripping clamp being fixedly fastened to one end of the guiding tube by means of a sleeve and a second gripping clamp being mounted to a second sleeve which is axially movable. The second clamp encloses the guiding tube with a sliding snug fit. The second clamp includes a sleeve being connected to a sliding pad by means of a radial finger protruding through an axial slit of the guiding tube, the slit being open at one end. The sliding pad is axially movable on the inner surface of the guiding tube and it is engaged with the threaded spindle by means of an inner threading.

In a known pressure spring tensioner as described in German patent No. (DE-PS No. 28 13 381) the cylindrical guiding tube has two diametrically opposed axial slits or openings through which radial fingers of the sliding pad protrude toward the outside and are supported on one of several transverse shoulders of the sleeve. These transverse shoulders are formed by recesses having the same width as the radial fingers and the axial slits.

While the slaving of the movable sleeve by the sliding pad in the tensing direction of a spring to be tensed is effected by the supporting of the transverse shoulders of the sleeve on the radial fingers of the sliding pad, one of the radial fingers is connected to the sleeve by means of a screwed-on bracket or shackle. In the known pressure spring tensioners this connection is a weak point because, during a machine-operated actuation of the threaded spindle in the relaxing direction of a tightened spring, the screw-connection between the bracket and the radial finger, or between the bracket and the sleeve always breaks. The breakage is due to a lack of attention of the gripping clamp rotating in the direction of the spindle head during relaxation of a spring mounted in a vehicle when it catches on a fixed object, e.g. the bottom spring reception, and the spindle is rotated further nevertheless. This often necessitates awkward and time-consuming repairs which usually entail an exchange of the sliding pad as well as of the sleeve.

Further weak points of the known pressure spring tensioners, which often lead to defects and repairs, result from the mounting of the threaded spindle in the guiding tube. The threaded spindle has smooth, tapered cylindrical sections at both ends, each of which is mounted in an axial thrust bearing. The threaded spindle is supported on the axial thrust bearing which is arranged at the end opposite the head of the static rod (at the bottom end of the static rod) by means of a traverse pin which is calibrated for a specific axial shearing force, and therefore forms a predetermined breaking point. The opposite end section has a key head pinned to the threaded spindle. The pin connection between the key head and the threaded spindle is also supposed to serve as a predetermined breaking point, in particular for the case that the threaded spindle is rotated further in the relaxation direction even if the movable gripping clamp has run into a non-yielding obstacle and the distance between the two gripping clamps can no longer be increased. In practice, however, it has turned out that even such a predetermined breaking point can entail difficult, time-consuming and therefore expensive repair if it breaks.

SUMMARY OF THE INVENTION

The invention provides a pressure spring tensioner with which the susceptibility to repair is minimized with simple means not requiring more material expenses, or space by increasing its resistance to breaking.

According to the invention this task is solved by calibrating the radial length of the radial finger joined in one piece to the sliding pad at no more than twice the thickness of the wall of the guiding tube. The radial finger protrudes into a radial recess of the sleeve which encloses it with little play in both axial directions as well as in both directions of rotation.

The main advantage of this arrangement is that due to the form-locking engagement of the radial finger with the recess of the sleeve, a rotational arresting of the sleeve in two rotational directions is achieved as well as a forced slaving of the sleeve by the sliding pad in both axial directions without requiring any additional, particularly fragile connection elements The bracket with the respective screws connecting the sleeve to the sliding pad required in the known pressure spring tensioner are eliminated. The stability under load of the connection between the sliding pad and the sleeve is the same in both axial directions.

With an arrangement of the recess in the sleeve, the radial finger and the axial slit the overturning moment generated by the spring tension forces can be kept the smallest.

According to an embodiment of the invention, it is possible to decrease the outer surface of the sliding pad lying close to the inner surface of the guiding tube, thus resulting in less friction without any influence on the guiding properties. It is also advantageous that the transfers from the outer surface of the radial finger into the cylinder surface of the sliding pad can be provided in transfer radii, which also add to an increase in stability at these locations.

To increase also the resistance to breaking relative to the mounting of the threaded spindle and to achieve a mounting of the threaded spindle in the axial direction nearly without play and by simple means, an embodiment wherein the flange is joined in one piece to the threaded spindle and the key head is screwed or welded on is preferred.

In another embodiment, a particularly good sliding guiding between the sliding pad and the sleeve and also between the sliding pad and the guiding tube is effected while making use of the maximal tensing stroke.

The use of a ring-shaped gripping clamp allows for the possibility of receiving a spring plate in which one end of the spring to be tensed is arranged.

Accordingly, it is an object of the invention to provide a pressure-tensioning spring which includes a hollow tube having a rotatable spindle therein by shifting a second clamp member in respect to a fixed first clamp member and a construction in which the movable clamp member includes a sleeve engaged around the tube and a pad which is threaded to a spindle in the tube so as to be movable thereby and which pad also includes a radial finger which extends into a recess of the sleeve so as to shift the sleeve with the movable clamp member.

A further object of the invention is to provide a pressure spring tensioner which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 3 is a section along the line III—III of FIG. 1;

FIG. 4 is an enlarged cross section of the movable sleeve;

FIG. 5 is a plan view of the movable sleeve according to FIG. 4 taken in the direction of arrow V of FIG. 4;

FIG. 6 is a side elevational view of the sleeve of FIG. 4;

FIG. 7 is a section along the line VII—VII in FIG. 6.

DETAILED DESCRIPTION OF THE PREFERRED EMBODIMENTS

Figures 1, 2:
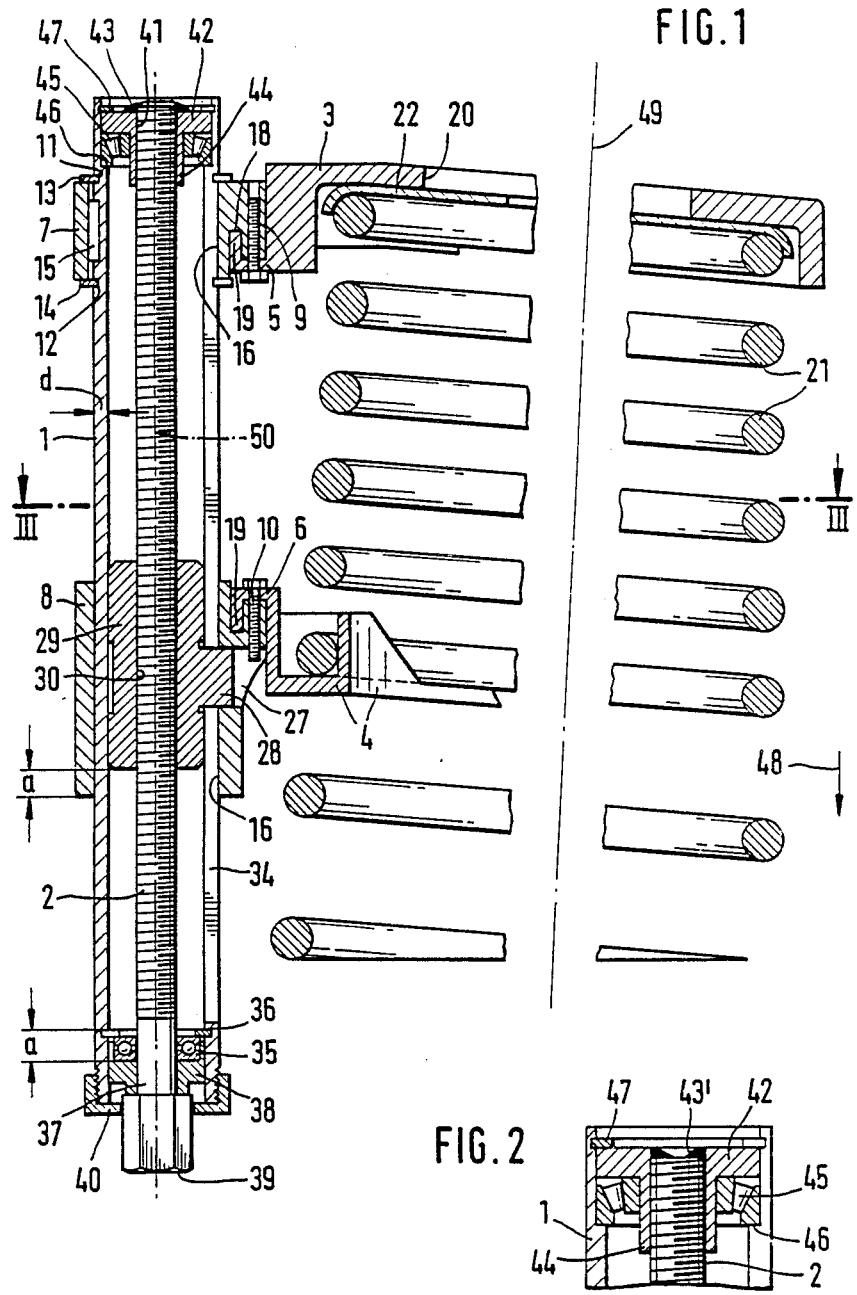
FIG. 1 is a cross-sectional view of a pressure spring tensioner constructed in accordance with the invention.
FIG. 2 is a partial sectional view of the end opposite the head of the spindle of the guiding tube and the threaded spindle.

Referring to the invention, in particular, the invention embodied therein comprises a pressure spring tensioner which includes a cylindrical guiding tube 1 having an axially elongated tube slot 34. A threaded spindle 2 extends axially within and is rotatably mounted in the tube 1. A first sleeve 7 is affixed to the tube 1 adjacent one end thereof and a first gripping clamp 3 is carried by the first sleeve 7. A second sleeve assembly includes a sleeve 8 and a pad 29. The sleeve 8 is slidable on the tube 1. A second gripping clamp is carried by the second sleeve assembly. The second sleeve is slidable on the tube with a sliding snug fit and it has a radial recess. A pad 29 is arranged in the second sleeve 8 and it is in threaded engagement with the spindle 2. The pad has a radial finger 28 extending through the recess 27 of the sleeve 8. The finger 28 is of a length which is no longer than twice the thickness of the guiding tube 1 and it engages in the radial recess of the second sleeve 8.

The pressure spring tensioner shown in the drawing comprises a cylindrical guiding tube 1, a threaded spindle 2 mounted therein, and two gripping clamps 3 and 4 which are fastened to a first sleeve 7 and a second sleeve 8 by means of hook-shaped connection profiles or brackets 5 and 6 and screws 9 and 10 respectively. The sleeve 7 is fastened axially between two securing rings 13 and 14 arranged in respective ring grooves 11 and 12 on the upper end section (in the drawing) of the guiding tube 1 and it is secured against rotation by a feather key 15. The sleeve 7 encloses the outer surface of the guiding tube 1 without play, resulting in a rigid connection between the sleeve 7 and the guiding tube 1. In its axial view from below, the sleeve 7 has the same cross-sectional shape as the sleeve 8 in its representation in FIG. 5; i.e. it comprises a one-piece metal element with a cylindrical bore 16 fitting onto the guiding tube 1 with a snug fit and having a semi-cylindrical shape on the side averted from the gripping clamp 3. The part of the sleeve 8 arranged on the side facing the gripping clamp 3 of the plane of symmetry 17 (FIG. 5) of the bore 16 has the outer shape of a rectangle. On the side facing the gripping clamp 4 the rectangular part of the sleeve 7 has a groove 18 with a rectangular profile running parallel to the plane of symmetry 17 and receiving a transverse web 19 of the gripping clamp 3 with a form-locking fit. The gripping clamp 3 has the shape of a self-contained L-shape profile ring with a relatively wide, circular opening 20, so that it can be set onto a spring cap 22 from above, receiving the end of a pressure spring 21 to be tensed. A shock absorber is arranged inside the pressure spring 21 and protrudes through the spring cap 22 from below. Favorably the inner ring surface of the gripping clamp 3 is provided with several centering stages having different diameters so that various sizes of spring caps can be received centrically by the same gripping clamp.

The lower gripping clamp 4 has a horse-shoe shape or U-shape and two legs 4/1 and 4/2 which are at least approximately circular and helical in shape. The profile of the two legs 4/1 and 4/2 is essentially L-shaped. The profile of the gripping clamp 3 is partially U-shaped due to an inner axial wall section 23, which runs approximately symmetrical to the plane of symmetry 24 over an angle of about 100°–110°, and therefore allows for a secure reception of a turn or loop of the pressure spring. A transverse web 19 of the hook-shaped connection profile 6 of the gripping clamp 4 engages form-lockingly with the transverse groove 18 of the sleeve 8 facing the sleeve 7 and it is detachably fastened by means of the screw 10 which is screwed into a threaded bore 25 of a transverse strip or rail 26 arranged parallel to the transverse groove 18. The cylindrical bore is executed so that it can receive the cylindrical guide tube 1 with a snug fit and be easily slidable, but essentially without play. The cylindrical bore is provided so that the cylindrical guide tube 1 can slide in it easily and with a snug fit, but essentially without play. A continuous and essentially rectangular recess 27 in the plane of symmetry 24 is arranged below the transverse groove 18 in about the axial middle of the wall of the sleeve 8. The recess 27 is provided for a reception without play on all sides of an equally rectangular radial finger 28 of a sliding pad 29.

The sliding pad has a cylindrical, longitudinal form which is adjusted to the hollow profile of the guiding tube 1 and it is provided with an inner threading 30, into which the threaded spindle 2 is screwed. A middle section 31 of the sliding pad 29 has a smaller diameter than its two end sections 32 and 33, whose diameter is adjusted to the inner diameter of the guiding tube 1 so that the sliding pad has an exact slide guiding in the guiding tube 1. The radial finger 28 protrudes through an axial opening 34 of the guiding tube 1 which is arranged in the plane of symmetry 24 and which is open at the upper end of the guiding tube 1 and which extends into the vicinity of an axial thrust bearing 35 arranged in the bottom end section of the threaded spindle 2. This axial bearing 35 can e.g. be a tapered roller bearing.

The reduced diameter of the middle section 31 protruding beyond the axial length of the radial finger on both sides does not only reduce the contact surface and therefore the frictional resistance between the sliding pad 29 and the guiding tube 1, but it provides the additional advantage that the transfer between the outer limitation surfaces of the radial finger 28 and the cylindrical outer surface of the sliding pad can be rounded, so that the risk of fraction is reduced considerably.

The sliding pad 29 is a forged part to which the radial finger 28 is joined in one piece and tip-stretched. In order to mount the sliding pad 29 functionally it is necessary that the radial length RL of the radial finger 28 measured at the cylindrical outer surface of the full diameter, i.e. measured from section 33 is no larger than twice the thickness d of the wall of the guiding tube 1. Thus it is possible to insert the sliding pad 29 in the manner shown in the dash-and-dot line in FIG. 4 before the guiding tube 1 is inserted into the sleeve 8 so that the radial finger 28 protrudes into the recess 27. Then the guiding tube 1 with the axial slot open at the top can be inserted into the sleeve 8 from below and at the same time the sliding pad 29 is centered in the bore 16, so that the arrangement shown in FIG. 1 is achieved, in which the sliding pad is mounted slidably in the guiding tube 1, its radial finger 28 protruding radially and through the axial slot 34 of the guiding tube and into the recess 27 of the sleeve 8 close-fittingly in which the sleeve 8 encloses the guiding tube with a snug fit without play. An exact fit of the radial finger in the guiding tube is guaranteed as the width of the radial finger 28 and the width of the axial slot are also selected to be without play.

FIG. 1 shows that the axial length of the sleeve 8 corresponds at least approximately to the axial length of the sliding pad and that the two parts are displaced relative to one another in the axial direction by the amount a. Due to this staggered arrangement the distance between the sliding pad 29 and the axial bearing 35 is larger than the distance between the sleeve 8 and the axial bearing. The result is that because of the arrangement of the axial thrust bearing 35 at the bottom end of the guiding tube 1 the maximal operational stroke of the movable gripping clamp 4 is not reduced. The axial staggering α corresponds approximately to the axial measure extent of the axial bearing 35 and the respective snap ring 36.

At its bottom end the threaded spindle 2 has a smooth cylindrical section 37 which can have the same diameter as or a larger diameter than the threading 2' and which is received by the axial bearing 35 and a support sleeve 38 receiving this axial bearing 35 centeringly. A wrench head 39 in the shape of a hexagonal head is joined in one piece to said cylindrical section 37. A tool with the corresponding wrench profile can thus be used for the rotation of the threaded spindle 2.

A screw-cap 40 advantageously closes the bottom end of the guiding tube 1 as shown in FIG. 1.

The upper end section of the threaded spindle 2 is screwed into a flange sleeve 42 having an inner threading 41 and is connected with it rotationally rigidly by means of a weld 43. The flange sleeve has a hub 44 which protrudes centeringly into an axial thrust bearing 45 in the shape of a tapered roller bearing, said bearing being supported on an inner ring shoulder 46 of the guiding tube 1.

The mounting is effected as follows: once the threaded spindle 2 is guided through the bottom axial bearing 35 and the sliding pad 29, the upper end of said threaded spindle 2 is screwed so far into the inner threading of the flange sleeve 42 that the wrench head 39 touches the bottom face of the supporting sleeve 38 and that the flange sleeve 32 lies close to the face of the axial thrust bearing 45. Then the end of the threaded spindle 2 which protrudes marginally from the face of the flange sleeve 42 is connected to the flange sleeve 42 by means of the weld 43, so that the flange sleeve rotates with the threaded spindle 2 when it is rotated. By this means the threaded spindle can be mounted and adjusted easily without axial play.

If repair becomes necessary the weld 43 can be ground off by means of a grinder and then the threaded spindle can be screwed out of the flange sleeve. Then the threaded spindle 2 can be shortened at its upper end, so that when it is screwed into the flange sleeve 42 again it does not quite reach its outer face, as shown in FIG. 2, and it can now be connected to the flange sleeve 42 by means of a new weld 43' arranged within the threaded bore of the flange sleeve 42. The snap ring 47 sitting in a snap ring groove above the flange sleeve 42 serves for the axial securing of the flange sleeve 42 and the axial thrust bearing 45 during mounting.

It is accepted that the connection profile 6 of the gripping clamp will break if during the rotation of the threaded spindle 2 in the stress-relieving direction, i.e. during an axial movement of the bottom gripping clamp 4 in the direction of the arrow 48, the gripping clamp 4 runs against a non-yielding obstacle and its distance relative to the upper gripping clamp cannot be increased any further. This merely requires that the gripping clamp has to be replaced. Herein the movable sleeve 8 and the sliding pad 29 do not have to be dismounted. A considerable amount of work is saved this way.

It can also be seen in FIG. 1 that the joint axis 49 of the two gripping clamps 3 and 4 does not run parallel with regard to the joint axis 50 of the guiding tube 1 and the threaded spindle 2 but at an angle thereto. The reason for this is that the distance between the middle axis of the upper gripping clamp 3, which is not shown, and the guiding tube 1 is approx. 2.5 cm larger than the distance between the middle axis of the horse-shoe-shaped bottom gripping clamp 4 and the guiding tube. This arrangement is necessary for the tensing of the pressure springs 21 having the shape of an oblique cone.

A horse-shoe-shaped gripping clamp, which would be congruent and mirror-inverted relative to the bottom gripping clamp 4, can be used on the fixed sleeve 7 instead of the ring-shaped gripping clamp 3.

While in FIG. 1 the end section of the guiding tube 1 receiving the axial thrust bearing 45 and the flange sleeve protrudes relatively far from the sleeve 7 of the gripping clamp 3, in practice the sleeve 7 is arranged so that the section of the guiding tube protruding from the sleeve 7 is as short as possible and is only a few mm long.

While specific embodiments of the invention have been shown and described in detail to illustrate the application of the principles of the invention, it will be understood that the invention may be embodied otherwise without departing from such principles.

What is claimed is:

1. A pressure spring tensioner, comprising a cylindrical guiding tube having an axially elongated tube slot, formed in a guiding tube wall having a guiding tube wall thickness a threaded spindle extending axially within and rotatably mounted in said tube, a first sleeve affixed to said tube adjacent one end thereof, a first gripping clamp carried by said first sleeve and engageable with a first end of the spring, a second sleeve assembly, a second gripping clamp carried by said second sleeve assembly, said second sleeve assembly including a second sleeve slidable on said guiding tube with a sliding snug fit, and having a radial recess, a pad in said second sleeve in threaded engagement with said threaded spindle and having a radial finger extending through said radial recess of said sleeve, said finger being of a length no longer than twice the thickness of said guiding tube wall and being engageable in said axially elongated tube slot so that rotation of said spindle advances said pad with said second sleeve and said second clamp to engage the spring opposite the spring first end.

2. A pressure spring tensioner according to claim 1, wherein said guide tube axial slot is arranged on a side of said tube facing said first and second gripping clamps.

3. A pressure spring tensioner according to claim 1, wherein the radial recess of said second sleeve is arranged substantially axially in the middle thereof at least approximately in its axial middle.

4. A pressure spring tensioner according to claim 1, wherein said sliding pad includes a cylindrical middle portion of a smaller diameter than each of the end portions thereof and wherein said radial finger extends outwardly of said intermediate portion.

5. A pressure spring tensioner according to claim 1, including an axial thrust bearing carried adjacent one end of said tube, rotatably supporting said spindle on the end of said tube having said fixed first sleeve and including a flange sleeve threaded on and welded to said spindle and having a hub portion carrying said axial thrust bearing, said thrust bearing being positioned inwardly of said flange in said tube.

6. A pressure spring tensioner according to claim 1, wherein said spindle has an end extending out of said tube, a wrench head threaded onto the end of said spindle which extends out of said tube, said tube having a radial shoulder with a support ring in said shoulder, a thrust bearing arranged inwardly of said support ring, and between said support ring and said wrench head and rotatably supporting said spindle and being under tensile load only during axial movement of said sliding pad in a direction to relax said second clamp's grip on said spring.

7. A pressure spring tensioner according to claim 1, wherein said sliding pad and said second sleeve has substantially the same axial length and are arranged in axial staggered relation to one another on said guide tube whereby the distance between said sliding pad and the end of said spindle and said tube is larger in approximately the axial size of a key head side axial thrust bearing than is the distance to said sleeve and including a side axial thrust bearing arranged in said tube at the end thereof away from said second clamp.

8. A pressure spring tensioner according to claim 1, wherein said tube has an end adjacent said fixed clamp which is open.

9. A pressure spring tensioner according to claim 1, wherein said first gripping clamp comprises a closed ring having an L-shaped cross-section and provides an alternate means of fastening particularly said fixed sleeve on said guiding tube.

* * * * *